United States Patent [19]

Burgess

[11] 3,738,283
[45] June 12, 1973

[54] RESILIENTLY CENTERED RAILWAY MOTOR TRUCK
[75] Inventor: Francis Travers Burgess, Kirkwood, Mo.
[73] Assignee: General Steel Industries, Inc., St. Louis, Mo.
[22] Filed: May 5, 1971
[21] Appl. No.: 140,429

[52] U.S. Cl............ 105/136, 105/175 R, 105/189, 105/196, 105/199 R
[51] Int. Cl......... B61c 17/00, B61f 1/14, B61f 3/06
[58] Field of Search .............. 105/183, 196, 199 A, 105/199 C, 199 R, 136, 175 R, 189

[56] References Cited
UNITED STATES PATENTS
| | | | |
|---|---|---|---|
| 3,451,355 | 6/1969 | Dobson et al................... | 105/196 X |
| 3,257,969 | 6/1966 | Thomas........................... | 105/199 C |
| 3,451,356 | 6/1969 | Lich............................. | 105/199 R X |

Primary Examiner—Gerald M. Forlenza
Assistant Examiner—Howard Beltran

[57] ABSTRACT

A resiliently centered bolsterless truck for railway locomotives has a rigid frame spring supported from the axles and is arranged to support a locomotive underframe at points spaced apart longitudinally of the truck to stabilize the truck frame against tipping longitudinally and thereby eliminate load transfer from axle to axle which would otherwise result from such tipping. The supports for the underframe from the truck frame comprise three elastomeric pad devices, one of which is annular and surrounds the truck center pin about which the truck swivels. The other two support devices are spaced lengthwise of the truck from the annular pad and are transversely aligned with respect to each other. Each pad device is held against horizontal movement with respect to the truck frame and includes means for securing it against relative horizontal movement with respect to a supported locomotive underframe, so that swivel and transverse movements of the underframe on the truck are accommodated by horizontal shear in the elastomeric pads, thus eliminating metal-to-metal frictional engagement of the underframe and truck frame.

10 Claims, 4 Drawing Figures

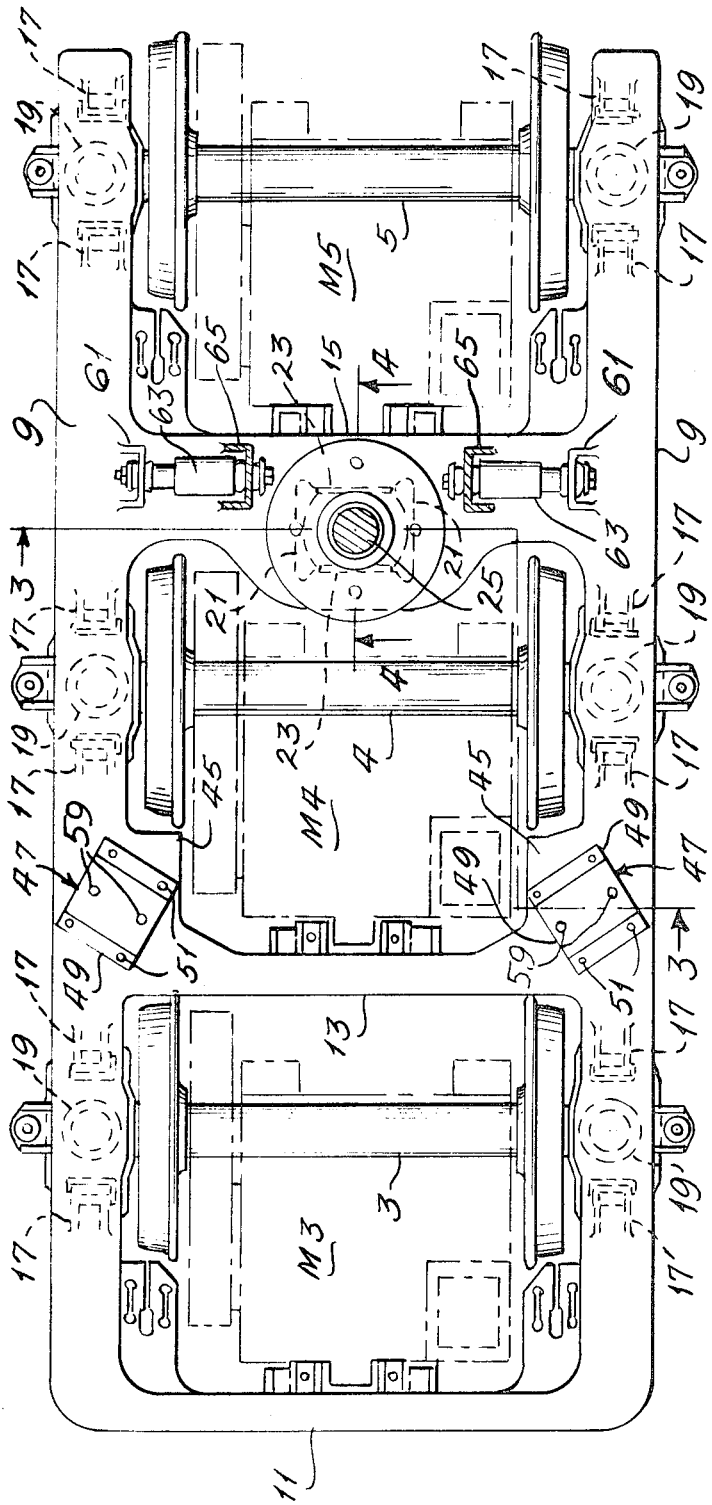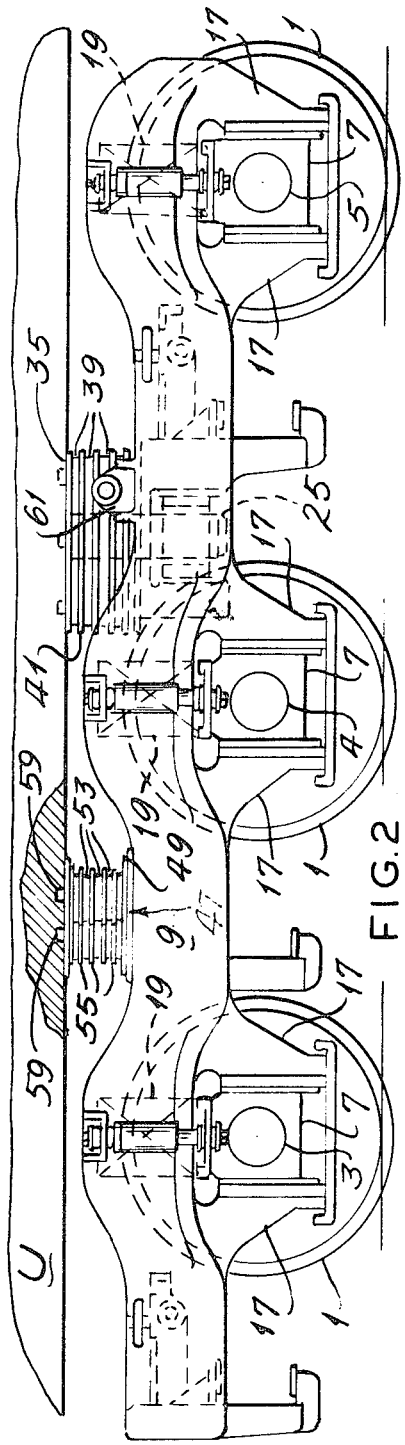
FIG.1
FIG.2
INVENTOR
Francis Travers Burgess

INVENTOR:
Francis Travers Burgess

RESILIENTLY CENTERED RAILWAY MOTOR TRUCK

BACKGROUND OF THE INVENTION

1. Field of the Invention

The invention relates to railway rolling stock and consists particularly in a locomotive power truck providing a three-point elastomeric support for a locomotive underframe on the truck frame.

2. The Prior Art

The prior art includes railway locomotive trucks having three points of sliding support for a locomotive underframe on the truck frame and other trucks having four points of elastomeric support on the truck frame with the swivel pivot at a different location from any of the points of support.

SUMMARY OF THE INVENTION

The invention provides an advantageous stable three-point support for a locomotive underframe on a truck, wherein frictional engagement between the opposing body and truck support parts is eliminated by the use of elastomeric pads in horizontal shear as the supporting means.

Objects of the invention include, in addition to the elimination of frictional engagement between the truck and underframe support elements, the reduction of noise and vibration transmission from the truck to the underframe by the insulating property of the elastomeric pads, reduction in load transference from axle to axle and consequent improvement in wheel to rail adhesion by long spacing of vertically stiff elastomeric support devices and arrangement of all motors with their reaction connections to the truck frame in the same direction longitudinally of the truck from their respective axles.

BRIEF DESCRIPTION OF THE DRAWINGS

FIG. 1 is a plan view of a railway truck embodying the invention.

FIG. 2 is a side elevational view of the truck illustrated in FIG. 1.

DESCRIPTION OF THE PREFERRED EMBODIMENT

Figure 3:
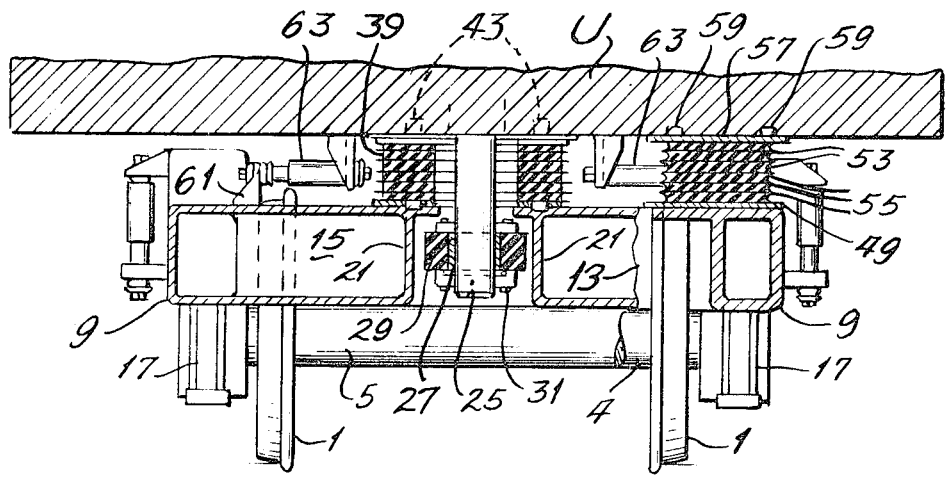
FIG. 3 is a transverse vertical sectional view along line 3—3 of FIG. 1.
Figure 4:
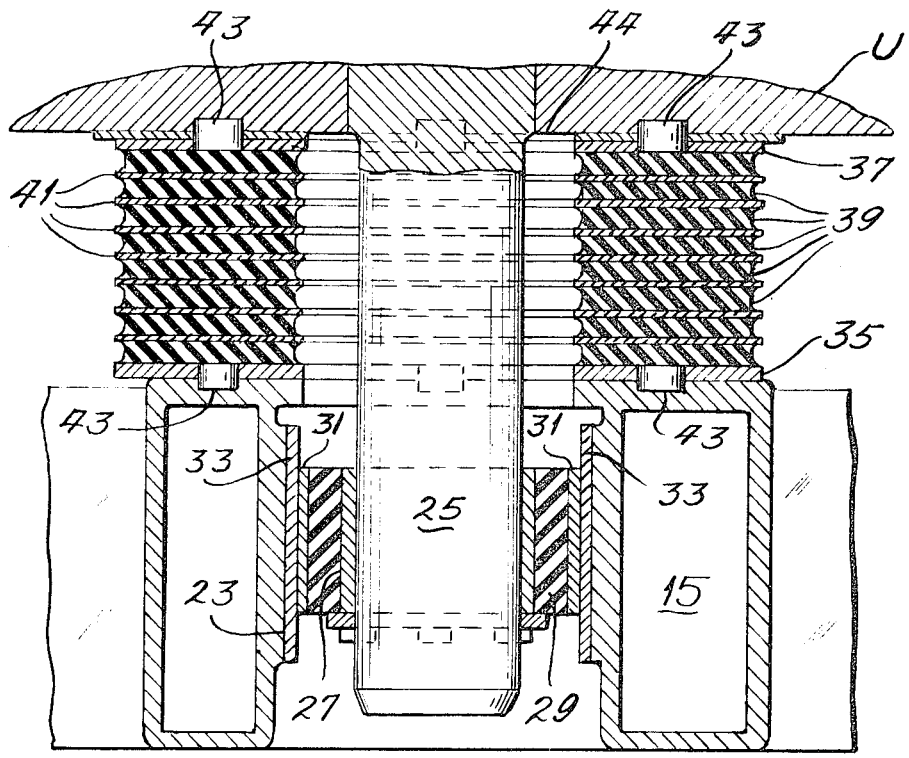
FIG. 4 is a fragmentary longitudinal vertical sectional view along line 4—4 of FIG. 1.

The truck has six wheels 1, mounted in gauged pairs respectively on transverse axles 3, 4 and 5 spaced apart lengthwise of the truck. At their ends outboard of wheels 1, axles 3, 4 and 5 mount journal boxes 7.

A rigid truck frame comprising longitudinally extending side members 9 spaced apart transversely of the truck and located outboard of wheels 1 and transverse transoms 11, 13 and 15 rigidly connecting side members 9, has six pairs of pedestal legs 17 depending from the side members to form downwardly open jaws embracing and vertically slidably receiving journal boxes 7.

Preferably the truck frame is resiliently supported on journal boxes 7 by means of coil springs 19 seated on top of the respective boxes and positioned within said members 9 thereabove.

Transom 11 is located longitudinally outboard of axle 3, and transoms 13 and 15 are located between axles 3 and 4, and axles 4 and 5 respectively and provide reaction connections to the truck frame of traction motors $M_3$, $M_4$, and $M_5$, on axles 3, 4 and 5, respectively, such that the reaction connections of the motors are all in the same direction longitudinally of the truck from the respective axles, whereby the motor torques exert no tipping force on the truck frame tending to vary the axle loading.

The truck includes a swivel connection for the locomotive underframe U, comprising transversely and longitudinally spaced vertical walls 21 and 23 in the central portion of transom 15 defining a transversely elongated generally rectangular recess, into which a vertical cylindrical pivot element 25 depends from underframe U. Pivot element 25 is pivotally received near its lower end in a cylindrical sleeve 27, the latter being molded within a rectangular block 29 of elastomeric material, two vertical sides of which are faced with hardened metal wear plates. Forward and rear walls 23 of the transom 15 recess are also faced with wear plates 33, and elastomeric block 29 is compressed in the recess with its wear plates 33 in slidable relation transversely and vertically with transom wear plates 33. This arrangement provides for swivel of the truck with respect to underframe U through pivotal movement of element 25 in block sleeve 27, lateral movement of the underframe relative to the truck frame through transverse sliding of wear plates 21 with respect to wear plates 23, and limited transverse and longitudinal tipping of the underframe and truck frame relative to each other through distortion of block 29, while at the same time transmitting longitudinal forces (traction and braking) from the truck frame to the underframe by the resistance of block 29 to compression.

For supporting underframe U on truck frame 9, 11, 13, 15, the upper surface of transom 15 surrounding recess 21, 23 is flat and horizontal, and an annular elastomeric pad device, comprising annular metal base and top plates 35 and 37, bonded to the bottom and top of a plurality of flat annular elastomeric pads 39, interleaved by annular metal plates 41, to which pads 39 are also bonded. Top and bottom plates 37 and 35 respectively are formed with a plurality of circumferentially spaced bosses 43 receivable in mating recesses in underframe U and transom 15 respectively to hold plates 37 and 35 respectively against horizontal movement relative to the underframe and truck frame. The central opening 44 in the annular pad device is substantially larger in diameter than pivot element 25, to accommodate lateral movement of the latter therein.

To distribute part of the underframe load to the truck frame between middle axle 4 and the end axle 3, the top surface of the truck frame is widened as at 45 adjacent the intersection of transom 13 and truck frame side members 9 and a pair of transversely spaced flat elastomeric pad devices 47 elongated generally transversely of the truck along tangents to an arc concentric with pivot element 25 are seated on widened portion 45. Each pad device 47 comprises a base plate 49, which may be bolted at 51 to the truck frame, a series of flat elastomeric pads 53, the lowermost of which is bonded to base plate 49, interleaved by metal plates 55, and a top plate 57 bonded to the uppermost pad and formed with a pair of upwardly extending bosses 59 projecting into mating recesses in underframe U to hold top plate 57 against horizontal movement relative thereto.

Elastomeric pads 39 and 53 of the annular pad device and pad devices 47 are compressed between underframe U and the top surface of the truck frame, so as to provide no substantial vertical movement between these parts, while permitting sufficient horizontal movement, through shear in the elastomeric pads, for swivel of the truck about pivot element 25 and for limited transverse movement of the underframe on the truck.

Thus the underframe load applied through the annular pad device and pad devices 47 acts through an arm lengthwise of the truck equal to the longitudinal spacing of the pad devices to provide a high movement opposing any tendency of the truck frame to tilt about a transverse axis responsive to tractive forces applied by the wheels to the rails and vary the load distribution from axle to axle.

For damping lateral and swivel movements of the underframe, the truck transom 15 may be formed with upwardly extending brackets 61 adjacent each of the frame side members 9, and transversely extending snubbing devices 63 are secured at their outer ends to brackets 61, their inner ends being secured to depending brackets 65 on underframe U.

Operation of the truck, applied to a locomotive, is as follows: As traction motors $M_2$, $M_3$ and $M_4$ drive their respective axles, through their reaction connections to transoms 11, 13 and 15 each applies a vertical force in the same direction to the truck frame, tending to maintain it parallel to the track and thus avoid varying the load on the axles from axle to axle. Since the elastomeric pad devices permit no substantial vertical movement of the underframe and truck frame relative to each other, their longitudinal spacing opposes any tendency of the truck frame to tip due to the application of tractive force at rail level, as would be in the case where the underframe is solely supported at a single point as by the usual truck centerplate.

When the wheels receive lateral impacts from lateral track irregularities, the elastomeric pad devices yield in shear transversely of the truck to accommodate relative lateral movement of the underframe and truck frame as is permitted by movement of pivot element 25 transversely in transom 15 recess 21, 23 and limited by the engagement of elastomeric block 29 with the longitudinal walls 21 of the recess. Such lateral movement is damped by the action of snubbing device 63.

During operation on curved track, swivel of the truck permitted by the pivotal reception of underframe pivot element 25 in sleeve 27 of elastomeric block 29 is accommodated by torsional shear in annular elastomeric pads 39 and 53. Tendencies of the truck to oscillate about pivot element 25 are opposed by the damping action of snubbing device 63.

Throughout operation of the truck, traction forces, as well as braking forces, are transmitted from the truck to the locomotive underframe by the resistance to compression of elastomeric block 29 between wear plates 31 and sleeve 27, and pivot element 25.

The invention may be modified in various respects as will occur to those skilled in the art and the exclusive use of all modifications as come within the scope of the appended claims is contemplated.

I claim:

1. A railway truck comprising longitudinally spaced wheel and axle assemblies, a truck frame resiliently supported thereon, vertical axis pivot means centered transversely of said frame for pivotal connection to an underframe, and three elastomeric pad devices supported on said truck frame and retained against horizontal movement thereon and having means for securing them against horizontal movement with respect to a supported underframe, one of said pad devices being of annular shape in plan concentric with said pivot means, and said other pad devices being similarly spaced longitudinally of the truck from said one pad device and transversely of the truck from each other, said annular device being of smaller diameter than the transverse distance between said other pad devices, said pivot means being movable transversely of said truck frame to permit lateral movement of a supported underframe thereon, the central opening in said annular pad device being of sufficient width transversely of the truck to accommodate maximum transverse movements of said pivot means therein, such lateral movement being accommodated by shear transversely of the truck in said annular pad device and said other pad devices.

2. A railway vehicle truck according to claim 1 including a separate motor mounted on each axle and having a reaction connection to said frame in longitudinally spaced relation from its respective axle, said reaction connections being located in the same direction longitudinally of the truck from all the axles.

3. A railway truck according to claim 2 wherein each said pad device comprises a plurality of flat elastomeric pads interleaved by metal plates.

4. A railway truck according to claim 3 wherein said pivot means comprises an upwardly open recess in said truck frame beneath said annular pad device, and a centrally vertically apertured block mounted in said recess for movement transversely of the truck and restrained against movement longitudinally of the truck.

5. A railway vehicle truck according to claim 4 including a vertical cylindrical pivot element pivotally received in said block aperture and adapted for rigid connection to a supported underframe.

6. A railway truck according to claim 4 wherein said block is of elastomeric material compressed between transverse walls of said recess and spaced from the longitudinal walls thereof.

7. A railway vehicle truck according to claim 6 wherein said block aperture is surfaced with a metal sleeve pivotally surrounding said pivot element and the fore and aft surfaces of said block are surfaced with metal plates.

8. A railway truck according to claim 2 including three of said wheel and axle assemblies, said truck frame comprising transversely spaced longitudinally extending side members and three transverse transoms including an end transom longitudinally outboard of one of said assemblies, a first intermediate transom between said one assembly and the second assembly, and a second intermediate transom between said second and third assemblies, said motor reaction connections being to said transoms respectively.

9. A railway truck according to claim 8 wherein said annular pad is seated on one of said intermediate transoms and said other pad devices are seated respectively in the region of the intersections of the other intermediate transom with said frame side members.

10. A railway truck according to claim 1 wherein said one pad device is of annular shape in plan.

* * * * *